UNITED STATES PATENT OFFICE.

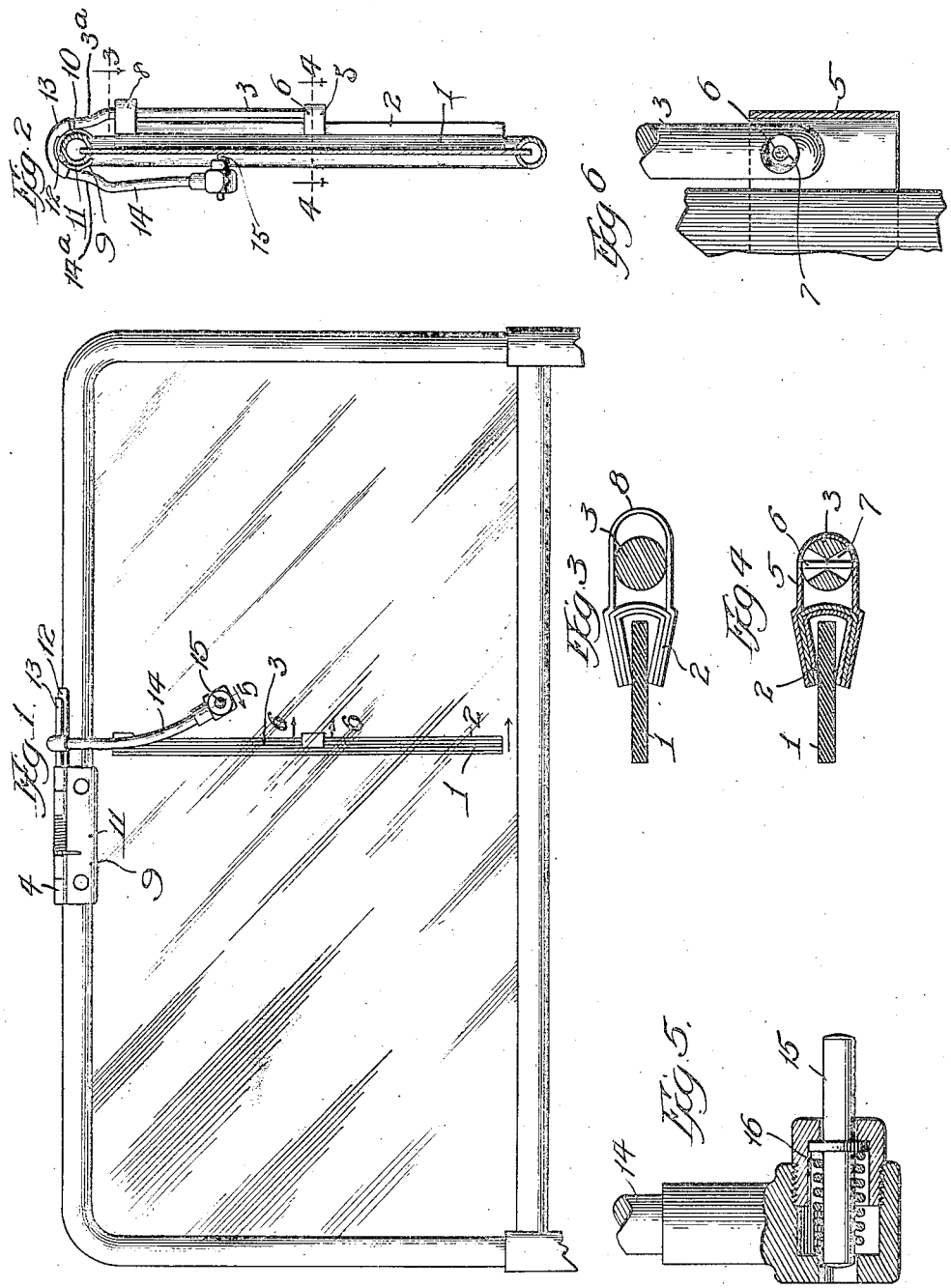

CHARLES J. HEINEMAN, OF CHICAGO, ILLINOIS, ASSIGNOR TO EMIL GROSSMAN M'F'G. CO. INC., OF BROOKLYN, NEW YORK, A CORPORATION.

WIND-SHIELD CLEANER.

1,112,793.      Specification of Letters Patent.      Patented Oct. 6, 1914.

Application filed December 21, 1910. Serial No. 598,609.

*To all whom it may concern:*

Be it known that I, CHARLES J. HEINEMAN, citizen of the United States, residing at Chicago, in the county of Cook and State of Illinois, have invented a certain new and useful Improvement in Wind-Shield Cleaners, of which the following is a full, clear, concise, and exact description.

The glass shields for automobiles are generally set in a frame consisting of round metal tubing; the driver sits back of the glass and is dependent upon its transparency for his view in directing the course of the car. Distinctness of vision is therefore dependent upon keeping clean the glass immediately in front of the driver's position. Provision must therefore be made for wiping the front face of the glass to remove dust and mud that are liable to accumulate at all times, and snow, which in winter, will often quickly gather so as to completely cover the front of the glass. While attempts have been made looking toward a device to be carried on the wind shield and operated for this purpose, I know of no structure prior to my invention that has fully or in any way satisfactorily met the conditions.

My invention may be characterized as an automatic squeegee for wind shields. The frame carrying the strip of rubber which is to be wiped back and forth at will over the front surface of the glass is provided with a guiding clamp adapted to be mounted upon the upper tube or sash of the glass and to be moved back and forth thereon. The strip of rubber or wiper is pivotally mounted upon the lower end of a rod depending from the guide; the said rod extending to the other side or back of the glass and provided there with a spring stud adapted to press against and ride upon such back surface of the glass and thus hold the rubber strip firmly in wiping contact against the front surface thereof as the guide is moved back and forth in the act of cleaning.

It should be remarked that an important feature of my invention consists in the construction whereby the rubber strip is pivoted so as to automatically adjust itself not only horizontally to bring the strip into wiping engagement with the glass as the direction of the movement thereof is reversed; but also to a slight extent vertically so as to cause the squeegee strip to adapt itself to any unevenness in the surface that is being cleaned.

My invention will be more readily understood by reference to the accompanying drawing, in which:

Figure 1 shows my cleaner mounted on the wind shield and in position of use when being moved to the right; Fig. 2 is a side elevation thereof in the same position, the shield being shown in transverse vertical section; Fig. 3 is a plan taken on line 3 of Fig. 2; Fig. 4 illustrates in detail the pivotal connection of the squeegee back with the depending rod of the movable carriage as seen from line 4—4 of Fig. 2; Fig. 5 is a sectional detailed view of the spring stud which rides on the back surface of the glass, taken on line 5—5 of Fig. 1; and Fig. 6 is an enlarged side view of the pivotal connection of the squeegee with the depending arm upon the section line 6—6 of Fig. 1.

Like parts are indicated by similar characters of reference in the different figures.

The rubber strip 1 with the back or metal mounting 2, taken together, may be termed the squeegee. My invention consists essentially in combining with the squeegee, mechanism for readily mounting the same upon the shield and for enabling the chauffeur conveniently and efficiently to wipe off the glass from time to time as may be required. The angle of the strip of rubber to the plane of the surface should be such that the working edge will be bent so as to give a frictional bearing surface of say about half an inch in width; the angle being automatically changed from left to right and right to left as the squeegee is carried back and forth. This movement is obtained by pivotally mounting the back 2, preferably at about midway of its length to the depending end of the rod 3 of the carriage 4. The mounting may consist of the loop or clip 5, and the pin 6, passing through the opening 7 provided in the end of said rod, said opening tapering preferably toward the central portion thereof to permit of the desired limited movement of the squeegee, say through an angle of about twenty degrees. Any other pivotal mounting which will give the squeegee limited angular movement back and forth may be employed. The corresponding loop or clip 8, as clearly shown in Fig. 3, has an oblong opening which permits a certain vibration back and forth of the squeegee so that no matter in which direction it may be moving over the surface of the glass, the working edge thereof will conform to any unevenness or curvatures in the said surface.

The member 9 of the carriage may consist, as shown, of the half tubular part 10 and the corresponding part 11 hinged thereto, the said part 11 being of about one-half the width of the corresponding part, that is to say, there is left in the member 9 an open slot somewhat wider than the thickness of the glass. The portion 10 is provided with an extension 12, on which is rigidly mounted the yoke 13. The rod 3, previously mentioned, depends from one side of this yoke, and the curved rod 14 carrying the spring stud 15 from the other side thereof. It will be seen that in this instance the rods or legs 3 and 14 are integral and at the upper portion rigidly secured to the yoke, the yoke in turn being rigidly secured to the extension 12.

It will be seen that the construction of the carriage is such that when in place it may readily be moved by the chauffeur back and forth, the rod 14 serving as a handle; at the same time the carriage will be free to rotate to a slight extent to permit the squeegee to conform to the surface being cleaned, in wiping engagement.

It should be noted that the counter opening 7 in rod 3 for the pin 6 is counter sunk so as to permit the automatic reversal in position of the squeegee when the direction of the movement of the carriage is changed, while, at the same time, the working edge of the strip must follow the surface being cleaned.

It will be understood that the member 9 must conform to the shape of the frame or other part of the shield on which it is mounted. In this instance it is made cylindrical and with an open slot and so constructed as to be readily placed in position for use and removed again when no longer required.

The force of the spring 16 of the stud 15 should be sufficient to cause the squeegee to press firmly against the front of the glass while at the same time adapted to yield sufficiently to permit the squeegee to turn back and forth to come into wiping engagement with the glass each time the direction of the movement of the carriage is reversed.

The rod 14 is preferably curved to one side of a vertical plane in order that by turning the device slightly to one side, in the act of inserting the same over the frame of the wind shield, sufficient space may be provided between the plunger 15 and the tube 3 to receive the frame of the shield. After the plunger 15 has been passed over the frame, the device is then turned into proper position to fit upon the upper edge of the frame. It will also be noted that the plunger 15 acts as a stop to prevent the carriage being inadvertently carried so far as to slide off the ends of the wind shield.

The rods 3 and 14 are preferably rounded as shown in Fig. 2 in order that when the wind shield is folded in the usual well-known manner the corresponding portion of the lower frame may fit against the end curved portions $3^a$ or $14^a$ respectively, depending upon whether the shield is folded outside or inside.

My invention admits of various modifications that will readily suggest themselves to those skilled in the art and I therefore do not wish to confine myself to all the details of the structure shown.

I claim:—

1. In a cleaner for automobile windshields, the combination with a carriage constructed to fit the frame of the wind-shield, whereby said frame constitutes a track for said carriage, of two rods depending from the opposite sides of said carriage, a wiper secured to one of said rods, and a spring stud carried upon the lower end of said other rod, said latter rod being bent laterally at said lower end.

2. In a cleaner for automobile windshields, the combination with a carriage, of a handle extending downwardly from one side of said carriage, a rod extending downwardly from the other side of said carriage, a vertically disposed wiper provided at its upper end with an elongated loop encircling the upper end of said rod and also with a loop encircling the lower end of said rod, said lower end of the rod being provided with an opening therethrough tapering toward the center of the rod, and a pin extending through said opening through the rod and having its opposite ends secured to said lower loop, whereby said wiper is pivoted to the lower end of said rod.

3. In a cleaner for automobile windshields, the combination with a carriage comprising two pivoted members constructed to fit the opposite sides of the frame of the wind-shield, of a longitudinal extension of one of said pivoted members, two depending rods secured to said extension and depending from the opposite sides of said carriage, and a wiper carried by one of said rods, the other of said rods constituting a handle for operating said carriage.

In witness whereof, I, hereunto subscribe my name this 19th day of December, A. D., 1910.

CHARLES J. HEINEMAN.

Witnesses:
 GEO. C. DAVISON,
 MCCLELLAND YOUNG.